US011076368B2

(12) United States Patent
Seo et al.

(10) Patent No.: US 11,076,368 B2
(45) Date of Patent: *Jul. 27, 2021

(54) METHOD FOR SYNCHRONIZATION SIGNAL TRANSMISSION IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Youngtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 28 days.

This patent is subject to a terminal disclaimer.

(21) Appl. No.: 16/596,841

(22) Filed: Oct. 9, 2019

(65) Prior Publication Data

US 2020/0037270 A1 Jan. 30, 2020

Related U.S. Application Data

(63) Continuation of application No. 15/510,159, filed as application No. PCT/KR2015/010222 on Sep. 25, 2015, now Pat. No. 10,455,528.

(Continued)

(51) Int. Cl.
*H04W 52/38* (2009.01)
*H04W 56/00* (2009.01)
*H04J 11/00* (2006.01)

(52) U.S. Cl.
CPC .......... *H04W 52/383* (2013.01); *H04J 11/00* (2013.01); *H04J 11/0059* (2013.01); *H04W 56/00* (2013.01)

(58) Field of Classification Search
CPC ..... H04W 52/383; H04W 56/00; H04J 11/00; H04J 11/0059
See application file for complete search history.

(56) References Cited

U.S. PATENT DOCUMENTS 10,455,528 B2 * 10/2019 Seo .................. H04J 11/0059
2014/0219270 A1 8/2014 Ro et al.
(Continued)

FOREIGN PATENT DOCUMENTS

CN 102075868 A 5/2011
WO WO 2016/048097 A1 3/2016

OTHER PUBLICATIONS

Alcatel-Lucent Shanghai Bell et al., "Considerations on D2D Synchronization Signal Design," 3GPP TSG RAN WG1 Meeting #76bis, R1-141260, Shenzhen, China, Mar. 31-Apr. 4, 2014, 3 pages.

(Continued)

*Primary Examiner* — Donald L Mills
(74) *Attorney, Agent, or Firm* — Birch, Stewart, Kolasch & Birch, LLP

(57) ABSTRACT

A method of transmitting a device-to-device (D2D) synchronization signal (SS) in a wireless communication system, includes transmitting to a first D2D user equipment (UE), by a second D2D UE, a primary D2D SS including ID information, the ID information informing whether the second D2D UE is an in-coverage UE or an out-of-coverage UE; and transmitting to the first D2D UE, by the second UE, a secondary D2D SS based on the primary D2D SS, wherein the primary D2D SS is transmitted on a same subframe as the secondary D2D SS and a physical sidelink broadcast channel (PSBCH), and wherein a transient period is included in a transmission region of the secondary D2D SS.

8 Claims, 9 Drawing Sheets

(a)

(b)

Related U.S. Application Data

(60) Provisional application No. 62/055,635, filed on Sep. 25, 2014, provisional application No. 62/056,434, filed on Sep. 26, 2014.

(56) References Cited

U.S. PATENT DOCUMENTS

| | | |
|---|---|---|
| 2014/0321450 A1 | 10/2014 | Zhang et al. |
| 2015/0029919 A1 | 1/2015 | Han et al. |
| 2015/0117375 A1 | 4/2015 | Sartori et al. |
| 2015/0215763 A1* | 7/2015 | Ro .................. H04W 8/005 455/426.1 |
| 2015/0215903 A1* | 7/2015 | Zhao ................. H04W 72/082 370/329 |
| 2016/0044620 A1 | 2/2016 | Bagheri et al. |
| 2016/0165547 A1 | 6/2016 | Ouchi et al. |
| 2016/0165563 A1* | 6/2016 | Jang ............... H04W 56/0025 370/328 |
| 2016/0242065 A1 | 8/2016 | Fukuta et al. |
| 2017/0048821 A1 | 2/2017 | Xu et al. |
| 2017/0150480 A1* | 5/2017 | Kim .................. H04W 8/005 |

OTHER PUBLICATIONS

Ericsson, "Synchronization Procedures for D2D," 3GPP TSG RAN WG1 Meeting #77, R1-142410, Seoul, Korea, May 19-23, 2014 (May 18, 2014), pp. 1-6, XP050789528.

Huawei et al., "Resources for D2D Synchronization Signals," 3GPP TSG RAN WG1 Meeting #78, R1-142986, Dresden, Germany, Aug. 18-21, 2014, 5 pages.

LG Electronics, "Discussion on Resource Allocation for D2D Synchronization," 3GPP TSG RAN WG1 Meeting #78, R1-143188, Dresden, Germany, Aug. 18-22, 2014, pp. 1-4.

Qualcomm Incorporated, "Overview of D2D," 3GPP TSG-RAN WG4 #72, R4-145188, Dresden, Germany, Aug. 18-22, 2014 (Aug. 17, 2014), pp. 1-4, XP050799724.

Samsung, "D2D Synchronization Procedure for Resource Pool Configuration," 3GPP TSG RAN WG1 Meeting #77, R1-142119, Seoul, Korea, May 19-23, 2014, 5 pages.

\* cited by examiner

FIG. 5
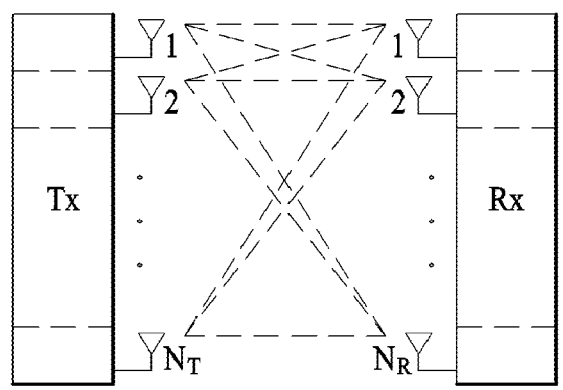
(a)
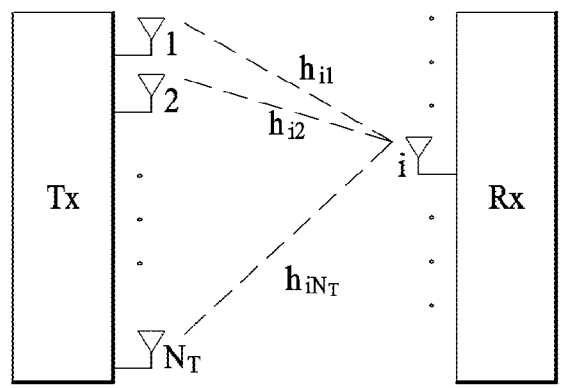
(b)

METHOD FOR SYNCHRONIZATION SIGNAL TRANSMISSION IN WIRELESS COMMUNICATION SYSTEM

CROSS-REFERENCE TO RELATED APPLICATIONS

This application is a Continuation of U.S. application Ser. No. 15/510,159, filed on Mar. 9, 2017 (now U.S. Pat. No. 10,455,528, issued on Oct. 22, 2019), which is the National Phase of PCT International Application No. PCT/KR2015/010222, filed on Sep. 25, 2015, which claim priorities under 35 U.S.C. 119(e) to U.S. Provisional Application No. 62/055,635, filed on Sep. 25, 2014 and 62/056,434, filed on Sep. 26, 2014, all of these applications are hereby expressly incorporated by reference into the present application.

BACKGROUND OF THE INVENTION

Field of the Invention

The following description relates to a wireless communication system and, more particularly, to a method and apparatus for generating and transmitting a synchronization signal in device-to-device (D2D) communication.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

SUMMARY OF THE INVENTION

An object of the present invention devised to solve the problem lies in setting of a physical layer ID, a power mask, etc. in generation/transmission of a D2D synchronization signal.

The technical problems solved by the present invention are not limited to the above technical problems and other technical problems which are not described herein will become apparent to those skilled in the art from the following description.

According to a first aspect of the present invention, provided therein is a method of transmitting a synchronization signal in a wireless communication system including generating the synchronization signal based on a cell ID determined depending on whether a user equipment (UE) for transmitting the synchronization signal is an out-of-coverage UE and transmitting the synchronization signal.

In a second aspect of the present invention, provided herein is a user equipment (UE) apparatus for transmitting a synchronization signal in a wireless communication system including a transmission module and a processor, wherein the processor generates the synchronization signal based on a cell ID determined depending on whether a user equipment (UE) for transmitting the synchronization signal is an out-of-coverage UE and transmits the synchronization signal.

The cell ID may be less than a predetermined value if the UE is an in-coverage UE and may be greater than the predetermined value if the UE is an out-of-coverage UE.

The synchronization signal may include a primary sidelink synchronization signal (PSSS) and a secondary sidelink synchronization signal (SSSS).

If the synchronization signal is transmitted on the same subframe as a physical sidelink broadcast channel (PSBCH), a transient period may be included in a transmission region of the SSSS.

Transmit power of the PSBCH and transmit power of the SSSS may have different values.

If the synchronization signal is transmitted on the same subframe as a physical sidelink broadcast channel (PSBCH), a transient period may be included in a reference signal region for the PSBCH.

According to one embodiment of the present invention, a UE, which has received a synchronization signal, can check whether a synchronization source, which has transmitted the synchronization signal, is within or outside coverage. Therefore, the UE can efficiently perform blind decoding. That is, the UE can check whether the synchronization source, which has transmitted the synchronization signal, is an in-coverage UE or an out-of-coverage UE and thus preferentially blind-decode the synchronization signal transmitted by the in-coverage UE.

The effects which can be obtained by the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram showing the configuration of a wireless communication system having multiple antennas.

DETAILED DESCRIPTION OF THE EMBODIMENTS

Figure 1:
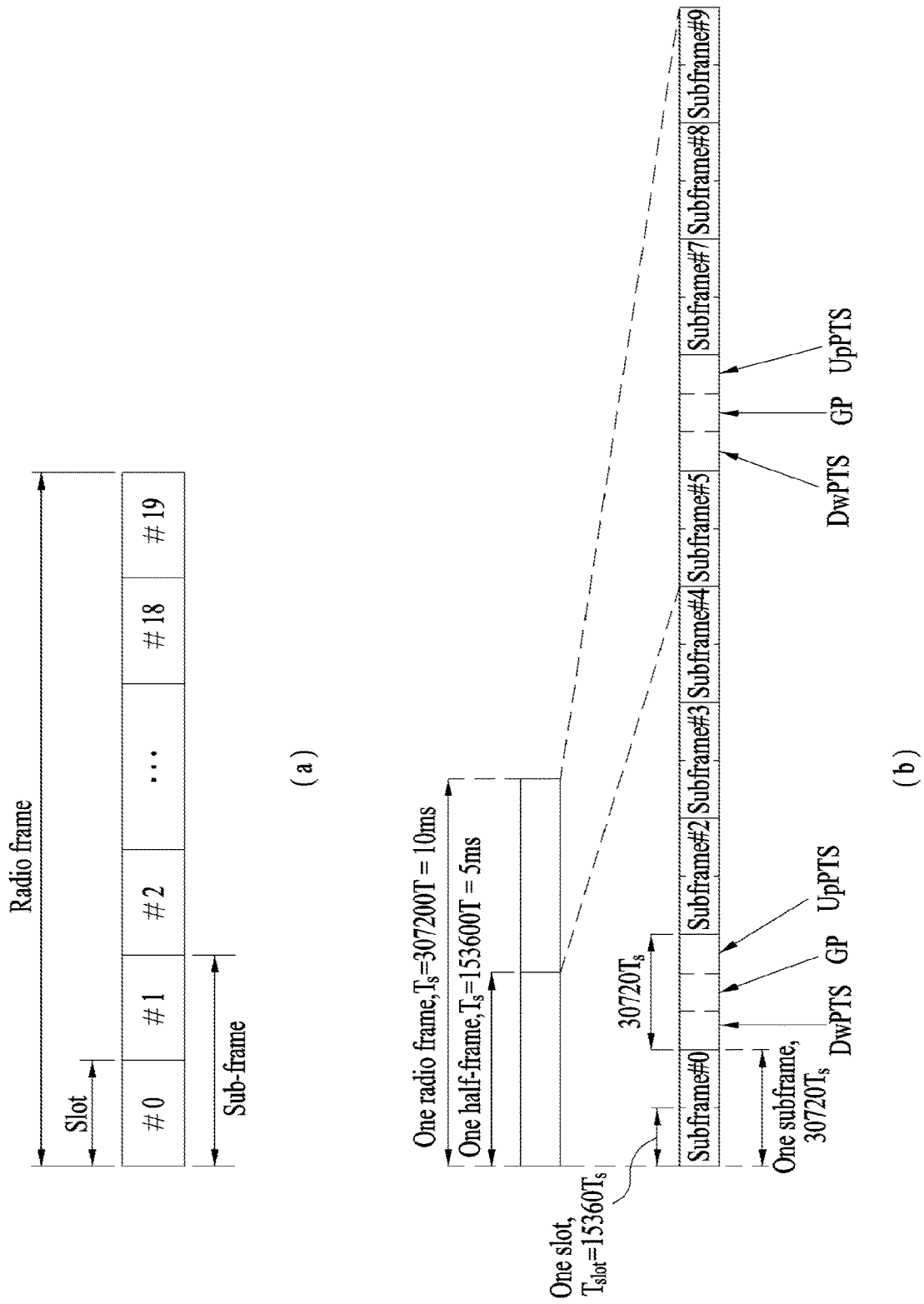
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
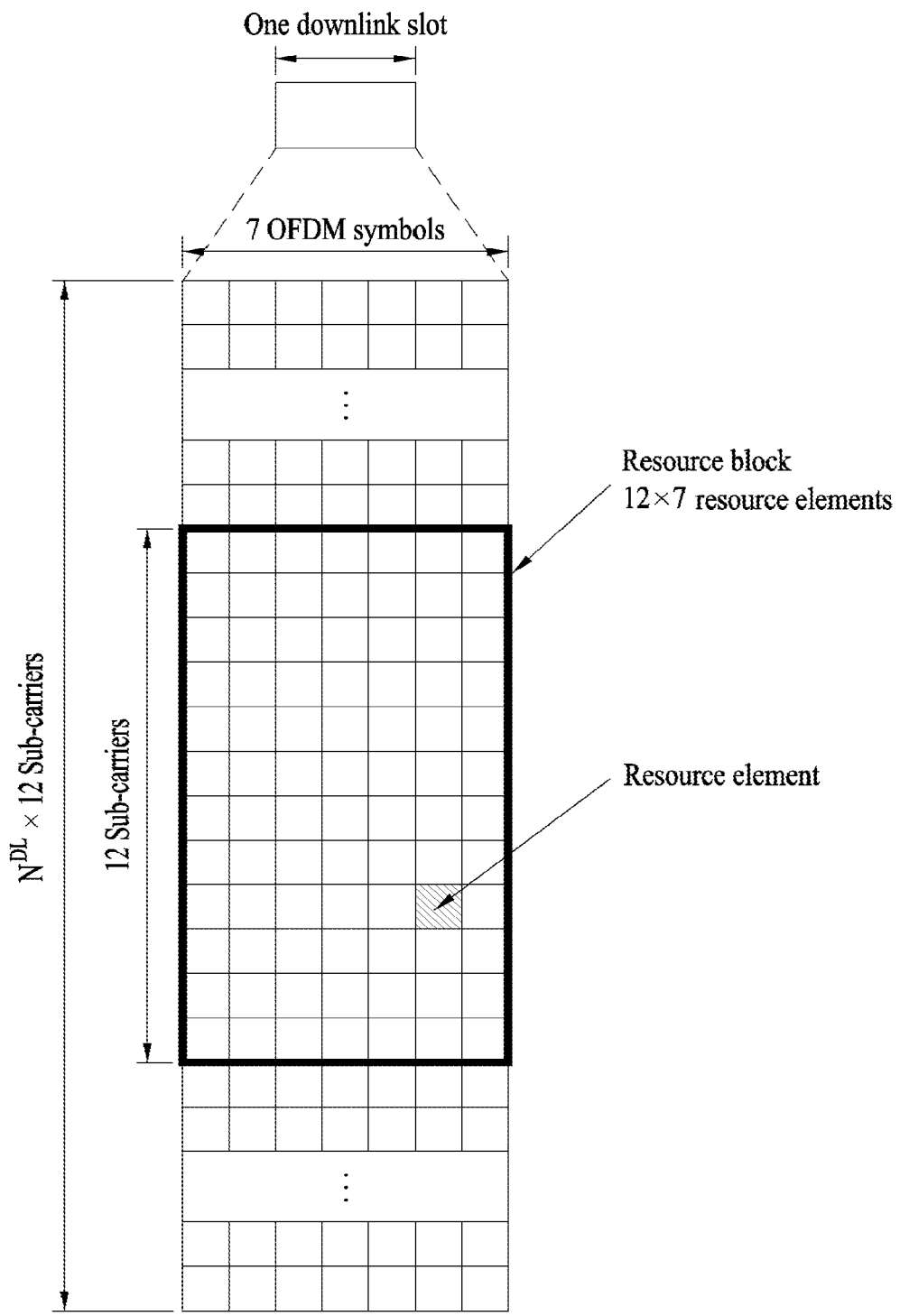
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
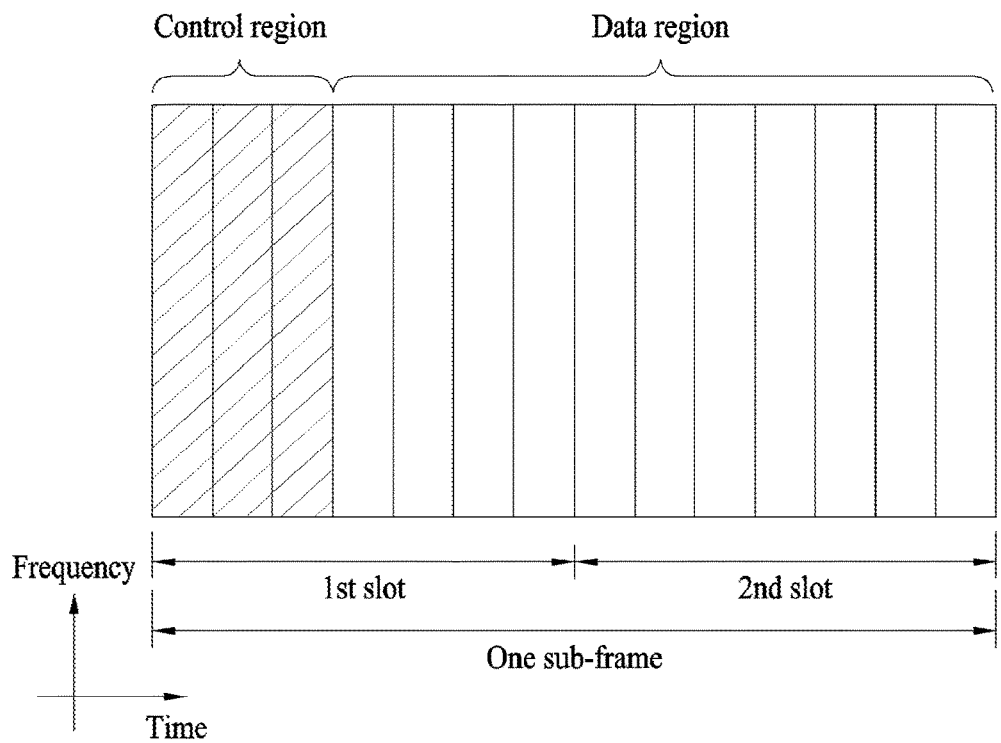
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
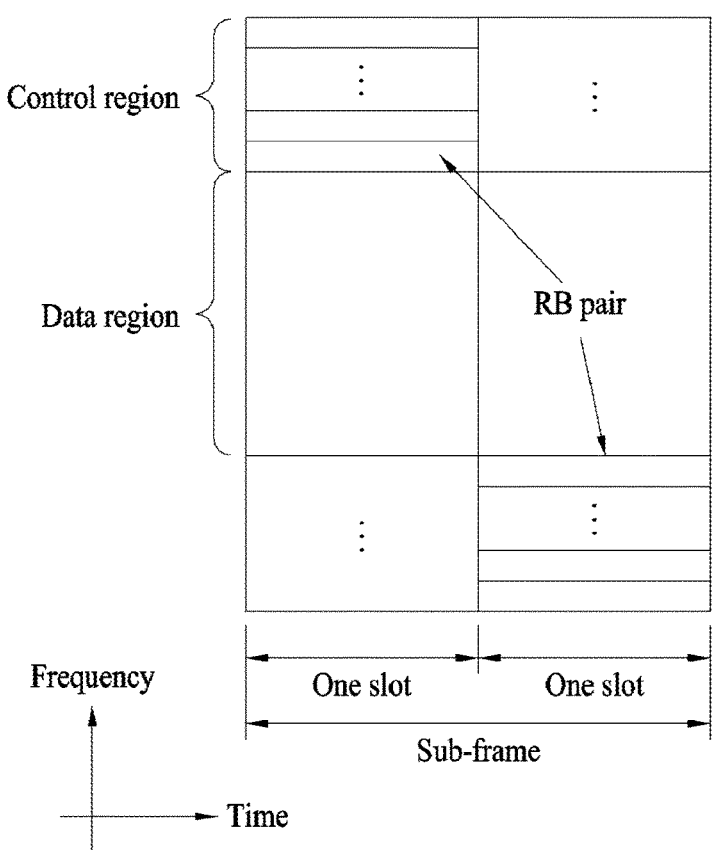
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MB SFN) RS used for coherent demodulation of a signal transmitted in MB SFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, can $\hat{S}$ be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \qquad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

Synchronization Acquisition of D2D UE

Hereinafter, synchronization acquisition between UEs in D2D communication will be described based on the above description and a legacy LTE/LTE-A system. If time/frequency synchronization is not acquired in an OFDM system, multiplexing of OFDM signals of different UEs may be impossible due to inter-cell interference. For synchronization acquisition, it is not efficient for D2D UEs to directly transmit and receive synchronization signals such that all UEs individually acquire synchronization. Accordingly, in a distributed node system such as D2D, a specific node may transmit a representative synchronization signal and the remaining UEs may acquire synchronization. In other words, for D2D signal transmission and reception, some nodes (at this time, the node may be an eNB, a UE or a synchronization reference node (SRN) (or a synchronization source)) may periodically transmit D2D synchronization signals (D2DSSs) as synchronization sources and the remaining UEs may acquire synchronization and transmit and receive a signal.

A transmission period of the D2DSS is not less than 40 ms and one or more symbols of a subframe may be used to transmit the D2DSS.

The D2DSS may include a primary synchronization signal (a primary D2DSS (PD2DSS) or a primary sidelink synchronization signal (PSSS)) and a secondary synchronization signal (a secondary D2DSS (SD2DSS) or a secondary sidelink synchronization signal (SSSS)). The PD2DSS may have a similar/modified/repeated structure of a Zadoff-Chu sequence having a predetermined length or a PSS. The SD2DSS may have a similar/modified/repeated structure of an M-sequence or an SSS.

The same priority criterion should be applied in selection of a D2D UE as a D2D synchronization source. A UE in an out-of-coverage environment may become a synchronization source if the strengths of all received D2DSSs are equal to or less than a predetermined value. A UE in an in-coverage environment may be set as a synchronization source by an eNB. If UEs acquire synchronization from an eNB, a synchronization source may be the eNB and a D2DSS may be a PSS/SSS. The D2DSS of the synchronization source derived from the eNB may be different from the D2DSS of a synchronization source which is not derived from the eNB.

A physical D2D synchronization channel (PD2DSCH) may be a (broadcast) channel, through which base (system) information which should be known to a UE before D2D signal transmission and reception (e.g., information related to a D2DSS, a duplex mode (DM), a TDD UL/DL configuration, resource pool related information, the type of an application related to a D2DSS, etc.) is transmitted. The PD2DSCH may be transmitted on the same subframe as the D2DSS or a subsequent subframe thereof.

The D2DSS may be a specific sequence and the PD2DSCH may be a sequence indicating specific information or a codeword subjected to predetermined channel coding. Here, an SRN may be an eNB or a specific D2D UE. In the case of partial network coverage or out-of-network coverage, a UE may be a synchronization source.

Figure 6:
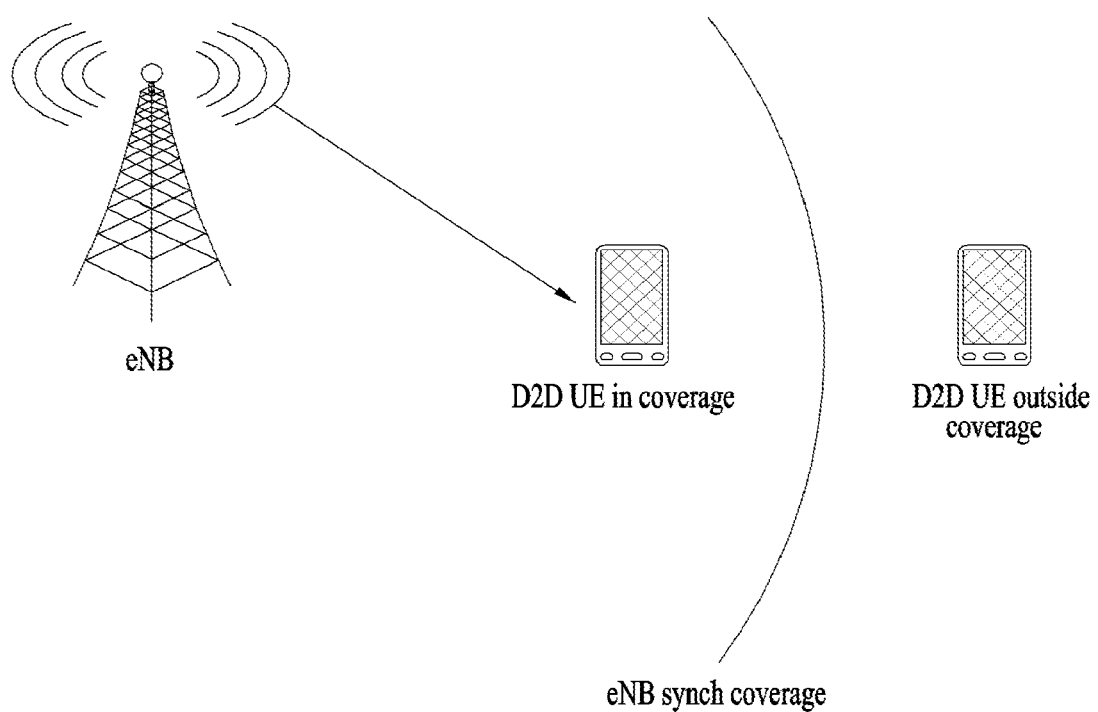
FIG. 6 is a diagram illustrating device-to-device (D2D) communication.

In a situation shown in FIG. 6, a D2DSS may be relayed for D2D communication with an out-of-coverage UE. In addition, the D2DSS may be relayed through multiple hops. In the following description, relaying a synchronization signal includes AF relaying of a synchronization signal by an eNB and transmission of a D2D synchronization signal of a special format at a synchronization signal reception time. By relaying of a D2D synchronization signal, an in-coverage UE and an out-of-coverage UE may directly perform communication.

Generation and Transmission of D2D Synchronization Signal

Hereinafter, a method of generating and transmitting a D2D synchronization signal and, more particularly, a secondary synchronization signal (SD2DSS) according to an embodiment of the present invention will be described.

The secondary synchronization signal is generated from a combination of two sequences. A method of combining the two sequences is changed according to the subframe indices of subframes in which the secondary synchronization signal is transmitted. More specifically, the secondary synchronization signal may be a concatenation of sequences having a length of 31 and the combination method thereof may be expressed by Equation 12 below.

$$d(2n) = \begin{cases} s_0^{(m_0)}(n)c_0(n) \text{ in subframe } 0 \\ s_1^{(m_1)}(n)c_0(n) \text{ in subframe } 5 \end{cases} \quad \text{Equation 12}$$

$$d(2n+1) = \begin{cases} s_1^{(m_1)}(n)c_1(n)z_1^{(m_0)}(n) \text{ in subframe } 0 \\ s_0^{(m_0)}(n)c_1(n)z_1^{(m_1)}(n) \text{ in subframe } 5 \end{cases}$$

In the above Equation, $m_0$ and $m_1$ are defined as follows:

$$m_0 = m' \bmod 31$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor,$$

$$q' = \lfloor N_{ID}^{(1)}/30 \rfloor$$

where, $N_{ID}^{(1)}$ denotes a physical cell identification group. In Equation 12, the two sequences $s_0^{(m_0)}(n)$ and $s_1^{(m_1)}(n)$ are expressed as shown in Equation 13 below by different cyclic shifts of an m-sequence.

$$s_0^{(m_0)}(n) = \tilde{s}((n+m_0) \bmod 31)$$

$$s_1^{(m_1)}(n) = \tilde{s}((n+m_1) \bmod 31) \quad \text{Equation 13}$$

where $\tilde{s}(i) = 1-2x(i)$, $0 \le i \le 30$, $x(\bar{i}+5) = (x(\bar{i}+2)+x(\bar{i})) \bmod 2$, $0 \le \bar{i} \le 25$, $x(0)=0$, $x(1)=0$, $x(2)=0$, $x(3)=0$, $x(4)=1$ As shown in Equations 12 and 13 above, different combination methods of the two sequences are used in subframe 0 and subframe 5. If the secondary synchronization signal is generated by a UE, that is, if a D2D UE generates the secondary synchronization signal, the above-described methods are used. However, the subframe indices for determining the combination methods may be regarded as being the same. That is, only the sequences used in subframe 0 (or 5) may be used. Alternatively, a subsequence having a good PAPR property (a sequence property corresponding thereto) per SSS sequence may be defined as a representative sequence. A specific subsequence among subsequences in each sequence of an SD2DSS (that is, a sequence used in subframe 0 of and a sequence used in subframe 5 of an existing SSS) may be selected as a representative sequence of the SD2DSS.

If the subframe indices for determining the combination methods may be regarded as being the same, the generated secondary synchronization signal may be transmitted on contiguous symbols. That is, the generated sequences may be transmitted on contiguous SC-FDMA symbols of subframe 0.

As described above, by defining synchronization signal generation in D2D, PAPR problems may be solved. If one of two symbols of an SD2DSS uses the same sequence as an SSS transmitted on subframe 0 and the other symbol uses the same sequence as an SSS transmitted on subframe 5, the PAPR may be differently set according to the SD2DSS symbol transmitted from the same synchronization source and power backoff for compensating for the PAPR may be differently applied according to the SD2DSS symbol. Such a method may reduce SD2DSS detection performance and increase complexity of a UE when PD2DSCH demodulation is performed using the SD2DSS. Accordingly, as described above, by equally using the SD2DSS in each symbol, such problems can be solved.

The PAPR problems will now be described in detail. If a PD2DSS/SD2DSS is designed based on an existing PSS/SSS, the PD2DSS is configured based on a Zadoff-Chu (ZC) sequence used in the PSS and the SD2DSS is configured based on an M-sequence used in the SSS. In addition, the number of root indices of a sequence used in the PD2DSS may be relatively less than that of root indices of a sequence used in the SD2DSS. (In the same setting as an existing LTE PSS/SSS, the number of root indices of the PD2DSS may be set to 3 and the number of root indices of the SD2DSS may be set to 168.) At this time, since the number of possible sequences is small in the PD2DSS, when several UEs simultaneously transmit PD2DSSs, it is difficult for the UE to identify the PD2DSSs. In addition, the PD2DSS powers of the UEs are accumulated and thus PD2DSS receive power may be overestimated. In order to prevent such problems, a receiver may identify the signal strengths of the detected D2DSSs through an average of receive powers of the PD2DSS and the SD2DSS or separately set an identification criterion of each synchronization signal to identify signal strengths.

Figure 7:
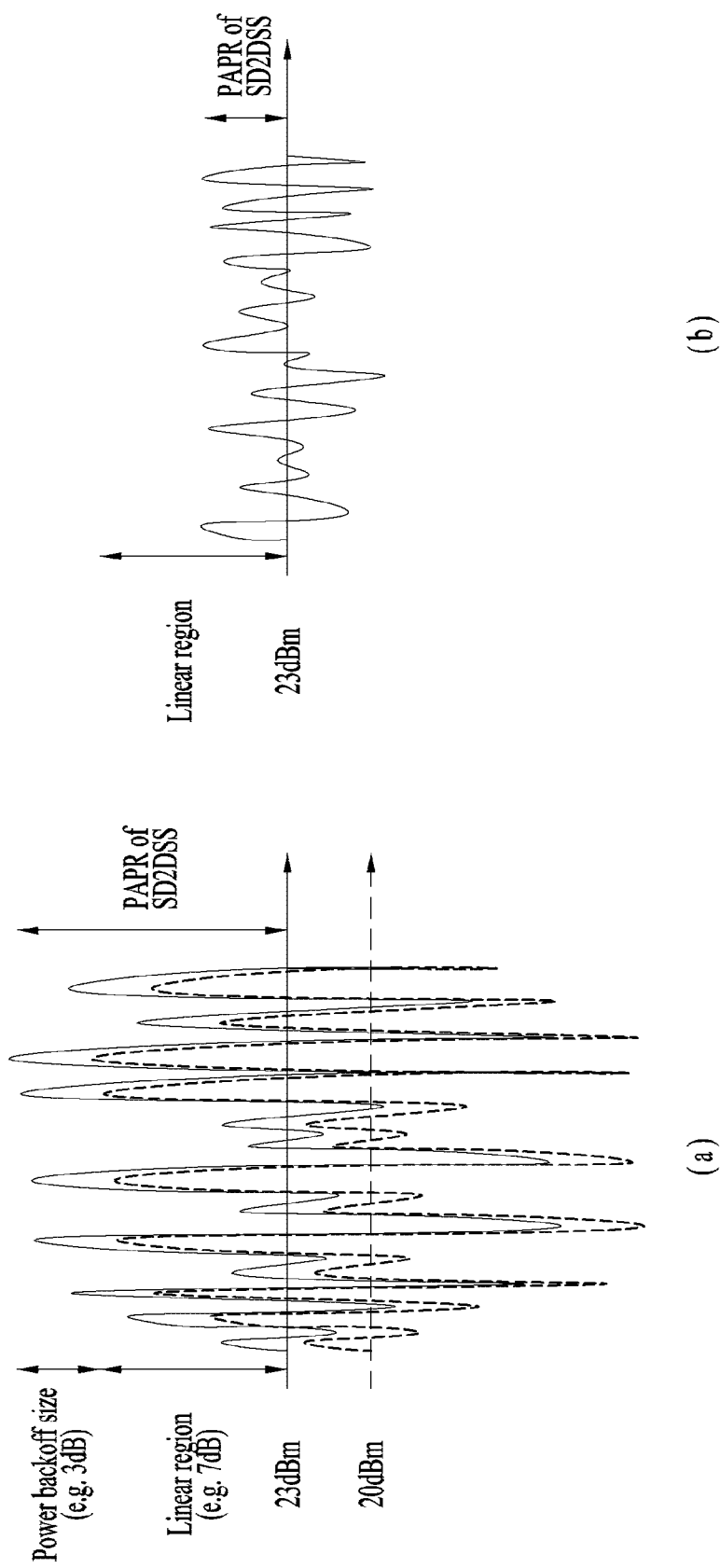
FIG. 7 is a diagram illustrating PAPR problems related to an embodiment of the present invention.

From the viewpoint of a transmitter, the M-sequence has a PAPR property greater than that of a ZC sequence, and the average transmit powers of the PD2DSS and the SD2DSS may be differently set according to amplification performance (e.g., a range capable of linearly amplifying a signal) of the transmitter. In this case, the coverage of the PD2DSS and the coverage of the SD2DSS may differ. Setting of different transmit powers of a PD2DSS and an SD2DSS according to PAPR property and a coverage difference will be described with reference to FIG. 7. FIGS. 7(a) and 7(b) show signal waveforms of an SD2DSS and a PD2DSS, respectively. Assume that an average of the powers of two sequences is 23 dBm (signal denoted by a solid line) and a maximum value of a signal which may be linearly amplified by a UE is 30 dB. In addition, assume that the PAPR (that is, a ratio of peak power to average power) of the SD2DSS is 10 dB and the PAPR of the PD2DSS is 3 dB. If the D2DSS is configured in this way, when the D2DSS is transmitted with the maximum (average) power of the UE, the PD2DSS may be transmitted without any problems. However, in the case of the SD2DSS, since a signal having instantaneous power of 30 dBm or more is distorted and transmitted, SD2DSS performance deteriorates. In order to solve such a problem, the average power of the SD2DSS may be reduced (such that the signal of the SD2DSS is not distorted). That is, as denoted by a dotted line of FIG. 7(a), if the average power of the SD2DSS is set to 20 dBm, SD2DSS transmission is possible without signal distortion of the SD2DSS. However, in this case, a difference in coverage between the PD2DSS and the SD2DSS may be generated due to a transmit power difference. This means that the PD2DSS may be detected but the SD2DSS may not be detected.

Hereinafter, in addition to the above-described synchronization signal generation method, the following methods of solving the PAPR problems will be described.

Power Reduction

Power reduction for a secondary synchronization signal may be considered. A D2D transmitter may select an SD2DSS sequence, apply power reduction defined for the sequence and transmit an SD2DSS. A D2D receiver may assume and apply power reduction defined for a detected SD2DSS sequence to a determination as to whether a synchronization source operates and PD2DSCH demodulation. Power reduction is applicable based on the maximum transmit power of the UE and is differently applicable according to UEs.

As a detailed reduction method, power reduction values of all possible sequences may be set. For a maximum of 1008 sequences, the power reduction value applied upon using each sequence may be predefined. Alternatively, power reduction is applicable per group. That is, the PAPRs of all sequences (or correlation with the PD2DSS and power amplification requirement) are pre-examined and sequences having similar properties may be grouped. Assume that the same power reduction is applicable to the sequences belonging to the same group. Alternatively, a specific power reduction value may be determined and applied to all sequences. The power reduction value may be determined according to PAPR property (or signal property corresponding thereto). For example, a power reduction value may be selected based on a sequence having the worst PAPR property (that is, a sequence having largest waveform fluctuation) or based on a PAPR average (or an intermediate value) of all sequences.

The power reduction value may be always or conditionally applied. Always applying the power reduction value may mean that D2DSS transmission is performed with maximum transmit power of a D2D UE. In contrast, conditionally applying the power reduction value may mean that the transmit power of a synchronization signal is less than maximum power and transmission is performed with the transmit power, a D2D UE may completely transmit/receive the PAPR of a selected SD2DSS sequence, a power reduction value less than a predetermined power reduction value is used, or power reduction is not performed. (Alternatively, if a linear region of power amplification includes the whole or a portion of a signal region of the SD2DSS sequence, a power reduction value may not be applied or a smaller power reduction value may be applied.) Additionally, if the signal region of the SD2DSS is greater than the linear region of the UE although the power reduction value defined by the following method is applied or if the UE cannot completely transmit the SD2DSS, transmission of the D2DSS may be dropped.

The power reduction value may be set based on the maximum transmit power of the D2D UE or the PD2DSS power. Alternatively, the maximum transmit power of the secondary synchronization signal may be determined by applying the maximum power reduction value for the secondary synchronization signal to the transmit power of the primary synchronization signal. For example, if the power reduction value is 3 dB and the maximum transmit power of the D2D UE is 23 dBm, the average power of the SD2DSS may be 20 dBm. Alternatively, if the transmit power of the PD2DSS is 20 dBm, the transmit power of the SD2DSS may be 17 dBm. Based on such a relationship, the D2D transmitter may set the transmit power of the PD2DSS/SD2DSS and the D2D receiver may assume a power reduction value defined for the detected sequence and perform reception operation.

Setting of Transmit Power of Synchronization Signal

The (average) transmit power of the PD2DSS may be set equally with the (average) transmit power of the SD2DSS. That is, power is controlled in order to adjust the coverage of the PD2DSS and the coverage of the SD2DSS to be equal. This means that the PD2DSS may not be transmitted with the maximum power of the UE according to the backoff size of the SD2DSS. That is, although higher power may be used, transmission should be performed with lower power.

A UE for transmitting a PD2DSS/SD2DSS may set average transmit power of the PD2DSS/SD2DSS according to the PAPR property of a (SD2DSS) sequence index selected thereby (or specified by a network). For example, if a sequence having a good PAPR property is selected from among SD2DSS sequences, the average power of the PD2DSS may be relatively less reduced to perform transmission. Referring to FIG. 7 again, in order to transmit the SD2DSS without distortion, the transmitter may transmit an SD2DSS with an average power of 20 dBm and transmit a PD2DSS with the same average power of 20 dBm. Such D2DSS power reduction may be differently applied according to UEs, which may mean a specific UE (e.g., a UE having a large linear region) may not perform power reduction. A UE, which has received the D2DSS, may measure receive power (e.g., the RSRPs of known signals (PD2DSS and SD2DSS)) at the resource with respect to the detected PD2DSS/SD2DSS pair and determine whether the UE becomes a synchronization source through comparison with a threshold (predefined or specified by higher layer signaling).

Definition of Linear Region of Transmitter

For example, if the linear region of a D2D UE (that is, a region in which a signal may be linearly amplified) is set to +5 dB as compared to a maximum power defined in a legacy LTE system, a UE, which has detected an SD2DSS sequence (group) having a PAPR property of 8 dB, may assume that the maximum power of the SD2DSS is set to (maximum power—3 dB) and apply a threshold less than the threshold of the PD2DSS by 3 dB. In this case, the transmission UE may determine the transmit powers of the PD2DSS and the SD2DSS based on a predefined value regardless of the linear region thereof and the predefined linear region may mean minimum requirement of the D2D UE amplification. At this time, the transmitter may perform transmission with allowed maximum power with respect to the PD2DSS/SD2DSS. (For example, in the above case, the PD2DSS may be transmitted with 23 dBm and the SD2DSS may be transmitted with 20 dBm capable of preventing signal distortion in consideration of PAPR.) The D2D receiver may determine a threshold for operation of a synchronization source in consideration of the detected SD2DSS sequence index and the predefined linear region.

Setting of Threshold at Receiver

A receiver may define a threshold of a PD2DSS and a threshold of an SD2DSS. For example, if the PD2DSS is transmitted with maximum power and the SD2DSS is transmitted with reduced power in order to prevent signal distortion, a lower threshold is applied to the SD2DSS. The threshold may be set to a specific value in advance or may be determined based on the PAPR property of the SD2DSS sequence detected by a reception UE (for example, a threshold may be predefined per sequence index (group)). (Alternatively, the threshold may be signaled by a network, a cluster header (synchronization header), etc.) If PD2DSSs are simultaneously received from a plurality of synchronization sources due to small root indices of the PD2DSS, it may be inadequate that a determination as to whether to operate as a synchronization source is made based on the signal quality of the PD2DSS. Accordingly, a determination as to whether to operate as a synchronization source may be made based on only the signal quality of the SD2DSS and only the threshold of the SD2DSS may be defined.

The above-described methods may be restricted to be applied to the case where the range of the signal waveform of the SD2DSS exceeds the linear region of the D2D UE power amplification. If the range of the signal waveform of the SD2DSS is distributed within the linear region, operation for performing SD2DSS power reduction and operation for setting different thresholds of the PD2DSS/SD2DSS may not be performed. To this end, information indicating whether one or more of the above-described methods is applied may be signaled. A D2D UE in network coverage may receive the information through higher layer signaling or a PD2DSCH. Alternatively, it may be predefined that power reduction is not performed in a specific PD2DSS root index, a specific SD2DSS root index or a combination of specific PD2DSS and SD2DSS.

In generation of the synchronization signal according to the embodiment of the present invention, a value $N_{ID}^{(2)}$ may be fixed regardless of the PD2DSS root index. More specifically, upon generating an existing synchronization signal, scrambling sequences $c_0(n)$ and $c_1(n)$ are defined as shown in Equation 14 below.

$$c_0(n) = \tilde{c}((n + N_{ID}^{(2)}) \bmod 31)$$

$$c_1(n) = \tilde{c}((n + N_{ID}^{(2)}) \bmod 31) \quad \text{Equation 14}$$

where, $\tilde{c}(i) = 1 - 2x(i)$, $0 \leq i \leq 30$ is defined as $x(\bar{i}+5) = (x(\bar{i}+3) + x(\bar{i})) \bmod 2, 0 \leq \bar{i} \leq 25$ ($x(0)=0, x(1)=0, x(2)=0, x(3)=0, x(4)=1$).

$N_{ID}^{(2)}$ is a parameter determined by a PSS root index and may be one of $\{0, 1, 2\}$ and $\{0, 1, 2\}$ may one-to-one correspond to a PSS root index $\{25, 29, 34\}$. Accordingly, if an SD2DSS is configured based on an SSS defined in legacy LTE, the property of a sequence may be changed by scrambling. In order to prevent this, upon generating the SD2DSS, the value $N_{ID}^{(2)}$ is fixed regardless of the PD2DSS root index. For example, the SD2DSS is generated using the same method as the existing SSS sequence but $N_{ID}^{(2)}$ may be fixed to 0 (or 1, 2 or M (an integer except for 0, 1 and 2)). Alternatively, in the above equation, $N_{ID}^{(2)}$ may be omitted or $c_0(n)$ and $c^1(n)$ may be omitted in a process of obtaining $d_1(n)$.

Similarly to c(n), scrambling sequences $z_1^{(m_0)}(n)$ and $z_1^{(m_1)}(n)$ may also be omitted.

If the scrambling sequences are omitted, the SD2DSS may be defined as shown in Equation 15 or 16 below. (In the following equations, symbols x and y mean symbols to which the SD2DSS is mapped.)

$$d(2n) = \begin{matrix} s_0^{(m_0)}(n) \text{ in symbol } x \\ s_1^{(m_1)}(n) \text{ in symbol } y \end{matrix} \quad \text{Equation 15}$$

$$d(2n+1) = \begin{matrix} s_1^{(m_1)}(n) \text{ in symbol } x \\ s_0^{(m_0)}(n) \text{ in symbol } y \end{matrix}$$

$$d(2n) = \begin{matrix} s_0^{(m_0)}(n) \text{ in symbol } x \\ s_1^{(m_1)}(n) \text{ in symbol } y \end{matrix} \quad \text{Equation 16}$$

$$d(2n+1) = \begin{matrix} s_1^{(m_1)}(n) z_1^{(m_0)}(n) \text{ in symbol } x \\ s_0^{(m_0)}(n) z_1^{(m_1)}(n) \text{ in symbol } y \end{matrix}$$

In the above description, a method of reducing the number of SD2DSS sequences was proposed and the number of SD2DSS sequences may be reduced (e.g., 168 sequences) by restricting (or selecting) $N_{ID}^{(2)}$ and/or the subframe index. Hereinafter, other methods of reducing the number of SD2DSS sequences will be proposed.

If an SD2DSS uses the same sequences as a Rel-8 SSS, 1008 sequences may be identified by $N_{ID}^{(1)}$, $N_{ID}^{(2)}$, and subframe index (0 or 5) and the sequence used for the SD2DSS may be selected according to the PAPR (or CM) properties of each sequence. (The number 1008 of sequences may be changed according to the number of root indices of the PD2DSS and, for example, may be changed to 336 if the number of root indices of the PD2DSS is 1, 336 and may be changed to 672 if the number of root indices of the PD2DSS is 2.)

The PAPRs (or CM) for a total of 1008 sequences may be derived and X (e.g., 168) higher-order sequences may be selected in descending order of PAPR and may be used as SD2DSS sequences. In this case, a sequence having a specific value of a specific parameter may not be used as an SD2DSS sequence according to PAPR properties. Parameter values (that is, $N_{ID}^{(1)}$, $N_{ID}^{(2)}$, and a subframe index) capable of generating the selected sequence may be predetermined.

One of six sequence groups identified by $N_{ID}^{(2)}$ and the subframe index may be used as an SD2DSS sequence. At this time, the group may be selected using a method of comparing CDFs of PAPRs (or cubic metric) of the sequences (e.g., 168 sequences) belonging to each group. For example, the parameters of six groups may be set to $\{N_{ID}^{(2)}, \text{subframe index } (0,5)\} = \{0,0\}, \{0,5\}, \{1,0\} \{1,5\}, \{2,0\}, \{2,5\}$.

The method of identifying the sequence by $N_{ID}^{(2)}$ and the subframe index may be performed with respect to each parameter and then a final sequence group may be formed by a value selected per parameter. For example, if $N_{ID}^{(2)}$ is 0, 1 or 2, the CDFs of the PAPRs (or CM) of 336 sequences may be compared to select one value and, if the subframe index is 0 or 5, the CDFs of the PAPRs (or CM) of 504 sequences may be compared to select one value, such that a sequence group including the selected two values is used as an SD2DSS sequence.

In the above-described methods, statistical characteristics may be analyzed and applied as follows.

Figure 8:
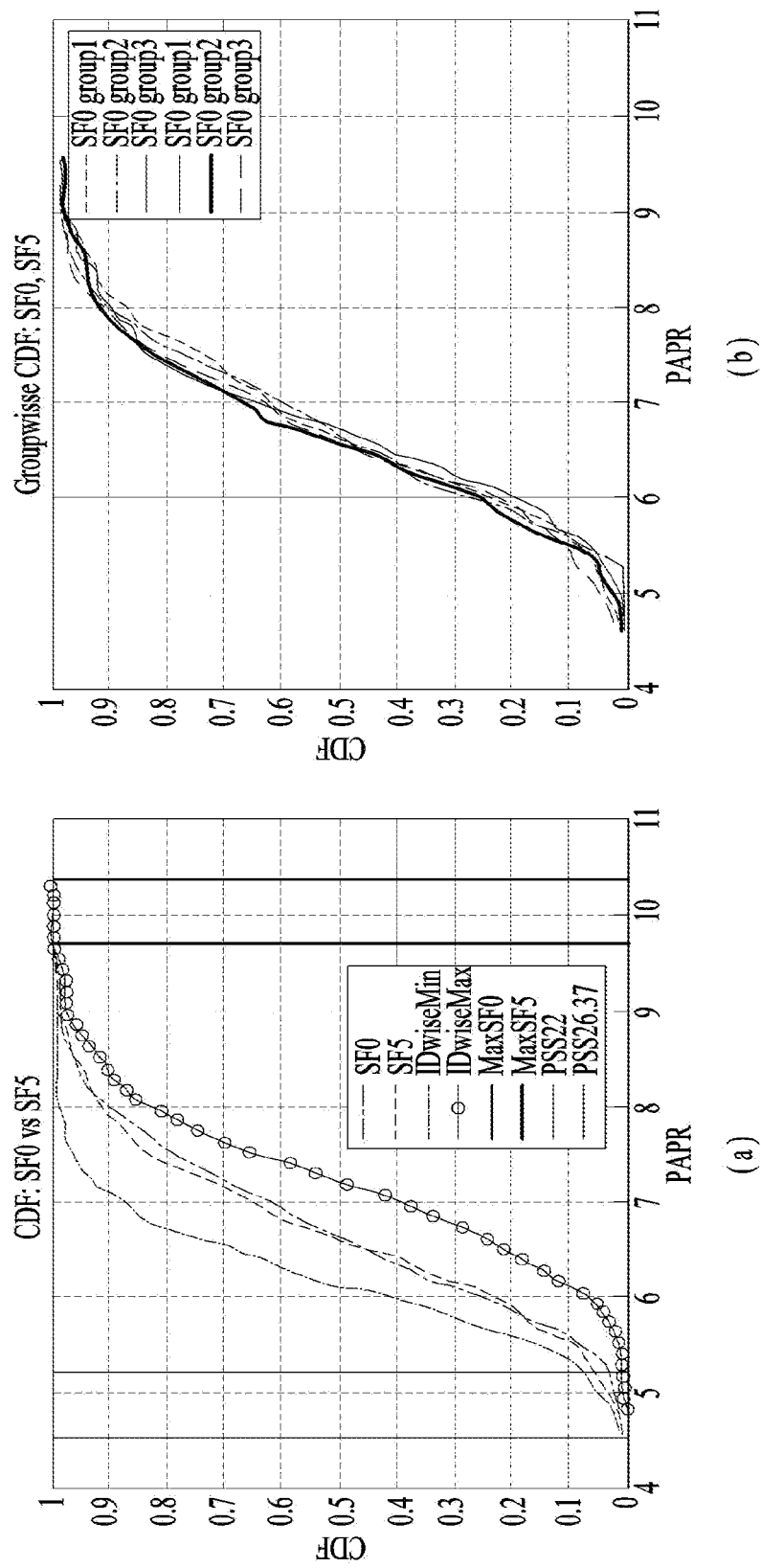
FIG. 8 is a diagram showing an experimental result according to a relation between a subframe index and a PAPR related to an embodiment of the present invention.

FIG. 8(a) shows a PAPR distribution according to subframe index. In FIG. 8(a), SF0(5) indicates CDF of the PAPRs of sequences (504 sequences) generated by the remaining parameters while fixing a subframe index to 0(5), and IDwiseMin(Max) means CDF of the PAPRs of (504 sequences) when a sequence with the lower (higher) PAPR is selected from between two sequences generated by a subframe index with the same $N_{ID}^{(1)}$, $N_{ID}^{(2)}$. As can be seen from FIG. 8(a), when the subframe index with the lower PAPR is selected from between the sequences generated by the subframe index, the PAPR has gain of 1 dB as compared to the case in which the subframe index with the higher PAPR is selected.

If operation shown in FIG. 8(a) is applicable to all parameters, sequence determination may be complicated and a sequence expression may become complicated. Accordingly, each parameter may be fixed and statistical characteristics may be analyzed, as shown in FIG. 8(b).

In FIG. 8(b), six groups were formed by fixing subframe indices (0, 5) and PD2DSS root indices (0, 1, 2) and the CDFs of the PAPRs of sequences (168 sequences) generated in each group were compared. In FIG. 8(b), it can be seen that the sequences generated when the subframe index is 5 and the PD2DSS root index is 2 have better PAPR properties than those of the sequences generated in the other groups. If the D2SS sequence parameter is determined through such a method, an equation for generating a sequence may be simply expressed.

Table 1 below shows combinations of $N_{ID}^{(1)}$, $N_{ID}^{(2)}$ each having a lower PAPR in subframe indices 0 and 5. For example, if $N_{ID}^{(2)} = 0$ and $N_{ID}^{(1)} = 0$, a lower PAPR is obtained when the SD2DSS is generated according to the format of subframe 0.

TABLE 1

| | SF0 | | | | | | | | |
|---|---|---|---|---|---|---|---|---|---|
| $N_{ID}^{(2)} = 0$ | 0 | 2 | 3 | 5 | 6 | 8 | 10 | 11 | 14 | 16 |
| | 18 | 19 | 23 | 24 | 25 | 25 | 27 | 30 | 32 | 35 |
| | 36 | 38 | 39 | 40 | 43 | 45 | 51 | 52 | 54 | 55 |
| | 57 | 61 | 62 | 63 | 64 | 66 | 68 | 70 | 73 | 75 |
| | 76 | 78 | 81 | 82 | 85 | 88 | 90 | 98 | 101 | 102 |
| | 103 | 107 | 108 | 109 | 110 | 112 | 113 | 114 | 118 | 120 |
| | 121 | 122 | 124 | 125 | 127 | 129 | 131 | 134 | 137 | 138 |
| | 142 | 143 | 145 | 149 | 150 | 153 | 155 | 156 | 157 | 158 |
| | 159 | 160 | 162 | 163 | 165 | 167 | | | | |
| $N_{ID}^{(2)} = 1$ | 3 | 6 | 7 | 9 | 11 | 12 | 14 | 17 | 18 | 19 |
| | 20 | 23 | 24 | 25 | 26 | 27 | 28 | 33 | 37 | 39 |
| | 40 | 41 | 44 | 48 | 52 | 53 | 55 | 58 | 59 | 60 |
| | 62 | 63 | 64 | 65 | 66 | 68 | 69 | 72 | 76 | 77 |
| | 79 | 83 | 86 | 87 | 89 | 95 | 99 | 100 | 102 | 104 |
| | 105 | 109 | 110 | 114 | 117 | 121 | 123 | 126 | 128 | 130 |
| | 135 | 136 | 137 | 139 | 142 | 143 | 144 | 148 | 150 | 154 |
| | 156 | 157 | 158 | 160 | 161 | 163 | 164 | 165 | 166 | |
| $N_{ID}^{(2)} = 2$ | 0 | 4 | 8 | 10 | 12 | 13 | 15 | 19 | 20 | 21 |
| | 24 | 25 | 26 | 27 | 29 | 30 | 34 | 37 | 40 | 41 |
| | 42 | 45 | 53 | 54 | 56 | 59 | 60 | 63 | 64 | 65 |
| | 66 | 70 | 72 | 73 | 74 | 75 | 77 | 78 | 80 | 81 |
| | 84 | 86 | 88 | 90 | 92 | 95 | 96 | 99 | 100 | 104 |
| | 105 | 110 | 111 | 113 | 114 | 115 | 122 | 123 | 124 | 125 |
| | 127 | 129 | 131 | 133 | 137 | 138 | 143 | 144 | 145 | 146 |
| | 147 | 153 | 155 | 156 | 157 | 158 | 159 | 161 | 162 | 164 |
| | 165 | 167 | | | | | | | | |
| | SF5 | | | | | | | | | |
| $N^{ID(2)} = 0$ | 1 | 4 | 7 | 9 | 12 | 13 | 15 | 17 | 20 | 21 |
| | 22 | 28 | 29 | 31 | 33 | 34 | 37 | 41 | 42 | 44 |
| | 46 | 47 | 48 | 49 | 50 | 53 | 56 | 58 | 59 | 60 |
| | 65 | 67 | 69 | 71 | 72 | 74 | 77 | 79 | 80 | 83 |
| | 84 | 86 | 87 | 89 | 91 | 92 | 93 | 94 | 95 | 96 |
| | 97 | 99 | 100 | 104 | 105 | 106 | 111 | 115 | 116 | 117 |
| | 119 | 123 | 126 | 128 | 130 | 132 | 133 | 135 | 136 | 139 |
| | 140 | 141 | 144 | 146 | 147 | 148 | 151 | 152 | 154 | 161 |
| | 164 | 166 | | | | | | | | |
| $N_{ID}^{(2)} = 1$ | 0 | 1 | 2 | 4 | 5 | 8 | 10 | 13 | 15 | 16 |
| | 21 | 22 | 29 | 30 | 31 | 32 | 34 | 35 | 36 | 38 |
| | 42 | 43 | 45 | 46 | 47 | 49 | 50 | 51 | 54 | 56 |
| | 57 | 61 | 67 | 70 | 71 | 73 | 74 | 75 | 78 | 80 |
| | 81 | 82 | 84 | 85 | 88 | 90 | 91 | 92 | 93 | 94 |
| | 96 | 97 | 98 | 101 | 103 | 106 | 107 | 108 | 111 | 112 |
| | 113 | 115 | 116 | 118 | 119 | 120 | 122 | 124 | 125 | 127 |
| | 129 | 131 | 132 | 133 | 134 | 138 | 140 | 141 | 145 | 146 |
| | 147 | 149 | 151 | 152 | 153 | 155 | 159 | 162 | 167 | |
| $N_{ID}^{(2)} = 2$ | 1 | 2 | 3 | 5 | 6 | 7 | 9 | 11 | 14 | 16 |
| | 17 | 18 | 22 | 23 | 28 | 31 | 32 | 33 | 35 | 36 |
| | 38 | 39 | 43 | 44 | 45 | 47 | 48 | 49 | 50 | 51 |
| | 52 | 55 | 57 | 58 | 61 | 62 | 67 | 68 | 69 | 71 |
| | 76 | 79 | 82 | 83 | 85 | 87 | 89 | 91 | 93 | 94 |
| | 97 | 98 | 101 | 102 | 103 | 106 | 107 | 108 | 109 | 112 |
| | 116 | 117 | 118 | 119 | 120 | 121 | 126 | 128 | 130 | 132 |
| | 134 | 135 | 136 | 139 | 140 | 141 | 142 | 148 | 149 | 150 |
| | 151 | 152 | 154 | 160 | 163 | 166 | | | | |

ID Used for Synchronization Signal

IDs (physical-layer cell identifiers) used to generate a synchronization signal according to an embodiment of the present invention may be determined depending on whether a UE, which has transmitted the synchronization signal, is an out-of-coverage UE. That is, a D2D receiver may determine whether a synchronization source, which has transmitted a D2DSS, is in an in-network UE or an out-of-network UE based on a detected PSSID. If the PSSID includes information indicating whether the UE, which has transmitted the synchronization signal, is within network coverage, the UE may preferentially perform blind decoding with respect to the PSSID transmitted by the UE within network coverage. The reason for preferentially synchronizing with the signal transmitted by the UE within network coverage is that the signal transmitted by the UE within network coverage is more important than information transmitted by a UE out of network coverage. More specifically, if the UE is an in-coverage UE, a synchronization signal ID (that is, PSSID) is less than a predetermined value and, if the UE is an out-of-coverage UE, a synchronization signal ID may be greater than a predetermined value. In one implementation, in determination as to whether the synchronization transmission UE is within network coverage, D2DSSue_net is indicated if $$PSSID < \frac{\text{max.index. of .} PSSID}{X}$$

and, otherwise, D2DSSue_oon is indicated. Here, D2DSSue_net means a PSSID set used when an in-network UE is a synchronization source and D2DSSue_oon means a PSSID used when an out-of-network UE transmits a synchronization signal.

As another example, a D2D transmitter within network coverage may be assigned a PSSID by a network and derive parameters for generating PD2SS and SD2SS sequences from the signaled PSSID. (In the following description, $N_{ID}^{(1)}$, $N_{ID}^{(2)}$ respectively mean parameters used to generate the PD2SS root index and the SD2SS sequence and the PD2SS/SD2SS is used to generate a sequence similar to the existing PSS/SSS.) For example, the parameter may be derived by Equation 17 below.

$$N_{ID}^{(2)} = (PSSID) \bmod K$$
$$N_{ID}^{(1)} = \frac{PSSID - N_{ID}^{(2)}}{K}$$
[Equation 17]

where, K denotes the number of root indices of the PD2SS sequence, $N_{ID}^{(2)}$ denotes a parameter related to the root index of a PD2SS sequence, and $N_{ID}^{(1)}$ denotes a parameter necessary to generate an SD2SS sequence.

In addition, K may be set to a small value such as 1, 2 or 3, which may mean that the root indices of the PD2SSs transmitted by different synchronization sources are identical. However, if synchronization sources which transmit different PD2SCHs use the same root index, synchronization performance may deteriorate. This means that performance deterioration may become severe when only a specific PD2SS root index is used in the same range (e.g., in-network or out-of-network). In order to prevent this problem, the same PD2SS root index may be uniformly used in in-network and out-of-network. This may mean that in-network and out-of-network are not identified by the PD2SS.

Transmission of D2D Synchronization Signal and Power/Time Mask

Figure 9:
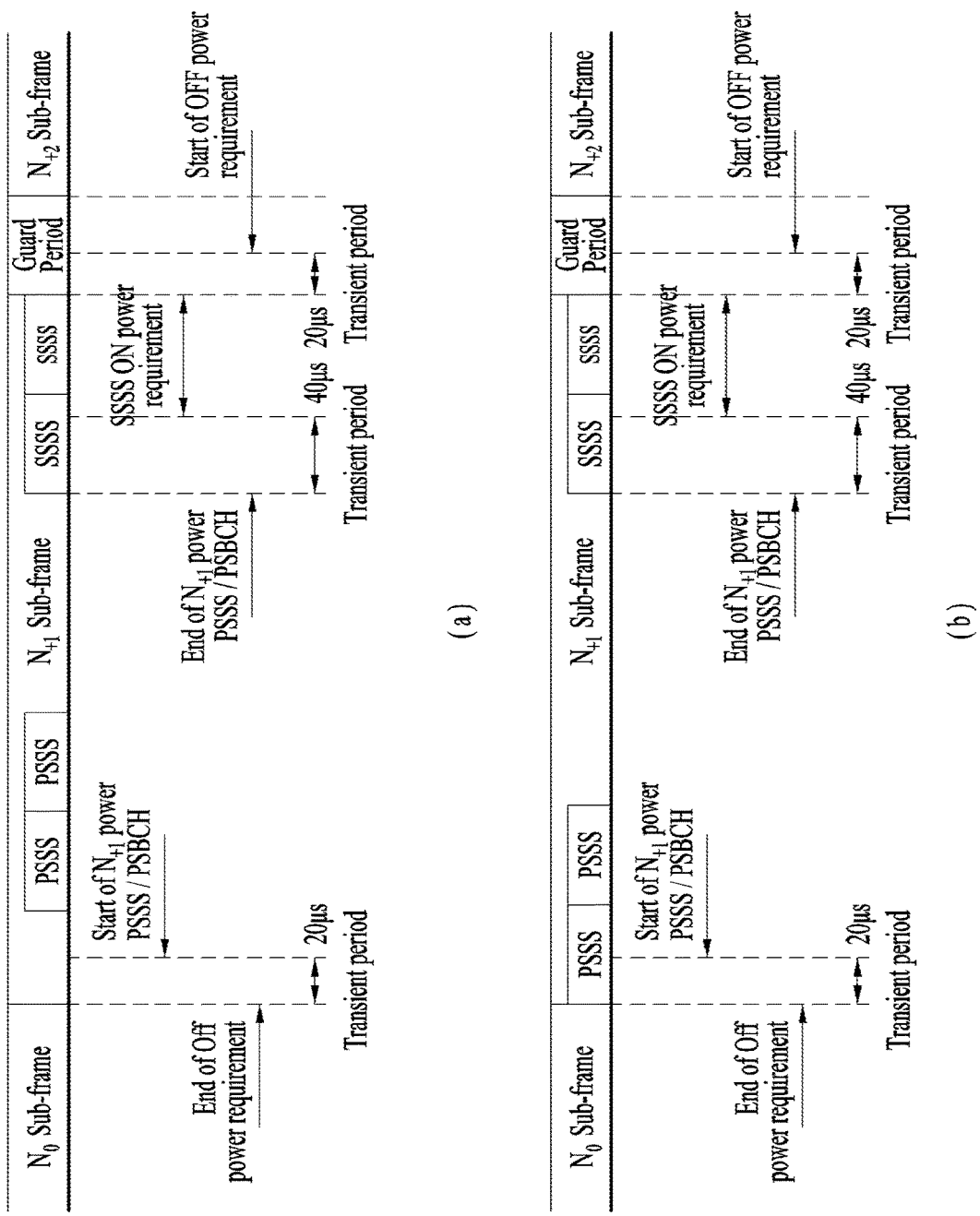
FIG. 9 is a diagram illustrating a power mask related to an embodiment of the present invention.

According to the embodiment of the present invention, in a subframe on which a synchronization signal is transmitted, a power mask may be set as shown in FIG. 9.

If a synchronization signal is transmitted on the same subframe as a physical sidelink broadcast channel (PSBCH) (a channel having the same properties as the above-described PD2SCH), a transient period may be included in a transmission region of an SSSS (or an SD2SS). That is, the transient period may be located for channel estimation performance of the PD2SCH. More specifically, if an SD2SS and a DMRS are contiguously arranged and a transient period is located in the DMRS, channel estimation performance may be decreased and PSBCH demodulation performance may be deteriorated. Therefore, the transient period is preferably located in the SD2SS symbol. At this time, the transmit power of the PSBCH and the transmit power of the SSSS may have different values. Setting of the transient period may correspond to positioning of the transient period according to the degree of importance of a signal. More specifically, since OFDM symbols transmitted by a UE are consecutive, if a transient period needs to be located between symbols, the transient period should be located in one of the two symbols and, as a result, performance deterioration may occur in symbol transmission. Accordingly, the transient period may not be located in an important signal which should preferentially avoid transmission performance deterioration.

The transient period may be set using various methods as follows. For example, for detection performance of an SD2DSS, a transient period may be located in a PD2DSCH DM RS. Alternatively, half of the transient period may be located in the SD2DSS and the other half thereof may be located in the PD2DSCH DM RS, for uniform influence between two types of signals. Alternatively, since a CP period is not used for signal detection, the transient period may be located in a symbol including the CP period. For example, if the SD2DSS is located just before the PD2DSCH DM RS on a time axis, since a CP of the PD2DSCH DM RS is located at the boundary between the two symbols, the transient period may be located in the PD2DSCH DM RS.

Meanwhile, if a transient period is required in an SD2DSS adjacent to codeword transmission of a PD2DSCH, the transient period is preferably located in the codeword of the PD2DSCH using more symbols.

Alternatively, if SD2DSS symbols are contiguous and a transient period is required between the SD2DSS symbols, i) the transient period may be located in the SD2DSS symbol with higher transmit power (e.g., lower PAPR) to protect the SD2DSS having lower transmit power, ii) half of the transient period may be located in each SD2DSS, for uniform influence between the two symbols, or iii) since a CP period is not used for signal detection, the transient period may be located in a symbol including the CP period, that is, the transient period may be located in the later SD2DSS between the contiguous SD2DSS symbols.

Description of the power mask is applicable when a synchronization signal is generated based on a PSSID determined depending on whether a UE for transmitting a synchronization signal is an out-of-coverage UE.

Configuration of Apparatus According to Embodiment of the Present Invention

Figure 10:
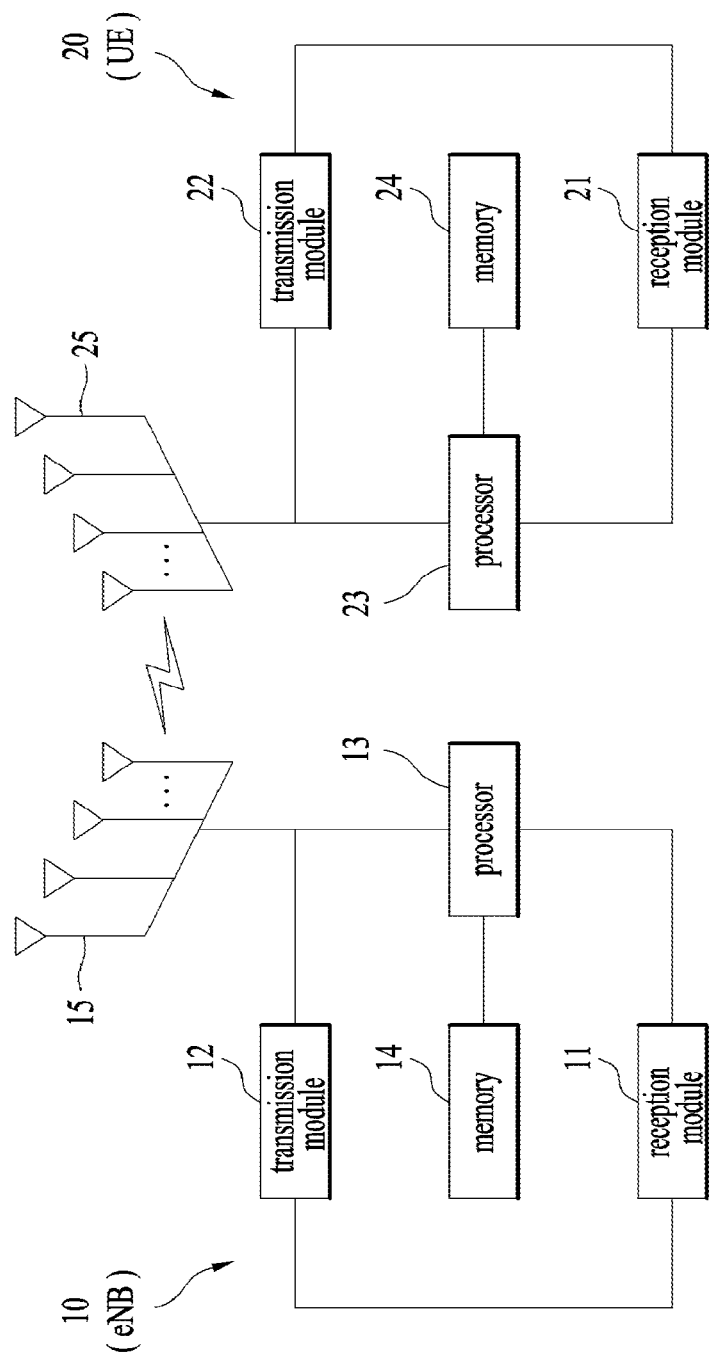
FIG. 10 is a diagram showing the configuration of transmission and reception apparatuses.

FIG. 10 is a diagram showing the configuration of a transmission point apparatus and a UE apparatus according to an embodiment of the present invention.

Referring to FIG. 10, the transmission point apparatus 10 according to the present invention may include a reception module 11, a transmission module 12, a processor 13, a memory 14 and a plurality of antennas 15. Since the plurality of antennas 15 is used, the transmission point apparatus may support MIMO transmission/reception. The reception module 11 may receive a variety of signals, data and information from the UE in uplink. The transmission module 12 may transmit a variety of signals, data and information to the UE in downlink. The processor 13 may control the overall operation of the transmission point apparatus 10.

The processor 13 of the transmission point apparatus 10 according to one embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 10, the UE apparatus 20 according to the present invention may include a reception module 21, a transmission module 22, a processor 23, a memory 24 and a plurality of antennas 25. Since the plurality of antennas 25 is used, the UE apparatus may support MIMO transmission/reception. The reception module 25 may receive a variety of signals, data and information from the eNB in downlink. The transmission module 22 may transmit a variety of signals, data and information to the eNB in uplink. The processor 23 may control the overall operation of the UE apparatus 20.

The processor 23 of the UE apparatus 20 according to one embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 10, the description of the transmission point apparatus 10 may also be equally applied to a device functioning as a downlink transmitter or an uplink receiver. The description of the VIE apparatus 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The above-described embodiments of the present invention are applicable to various mobile communication systems.

What is claimed is:

1. A method of transmitting a device-to-device (D2D) synchronization signal (SS) in a wireless communication system, the method comprising:
   transmitting to a first D2D user equipment (UE), by a second D2D UE, a primary D2D SS including ID information, the ID information informing whether the second D2D LIE is an in-coverage UE or an out-of-coverage UE; and
   transmitting to the first D2D UE, by the second D2D UE, a secondary D2D SS based on the primary D2D SS,
   wherein the primary D2D SS is transmitted on a same subframe as the secondary D2D SS and a physical sidelink broadcast channel (PSBCH), and
   wherein a transient period included in a transmission region of the secondary D2D SS is between the PSBCH and the secondary D2D SS.

2. The method of claim 1, wherein,
   the ID information is less than a predetermined value based on the second D2D UE being the in-coverage UE, and
   the ID information is greater than theft predetermined value based on the second D2D UE being the out-of-coverage UE.

3. The method of claim 1,
   wherein the transient period is a channel estimation period for the PSBCH.

4. The method of claim 1, wherein transmit power of the PSBCH and transmit power of the secondary D2D SS have different values.

5. A second device-to-device (D2D) user equipment (LTE) for receiving a synchronization signal (SS) in a wireless communication system, the second D2D comprising:
   a transceiver; and
   a processor,
   wherein the processor is configured to control the transceiver to:
   transmit to a first D2D UE, a primary D2D SS including ID information, the ID information informing whether the second D2D UE is an in-coverage UE or an out-of-coverage UE,
   transmit to the first D2D UE, a secondary D2D SS based on the primary D2D SS,
   wherein the primary D2D SS is transmitted on a same subframe as the secondary D2D SS and a physical sidelink broadcast channel (PSBCH), and
   wherein a transient period is included in a transmission region of the secondary D2D SS is between the PSBCH and the secondary D2D SS.

6. The second D2D UE of claim 5, wherein,
   the ID information is less than a predetermined value based on the second D2D UE being the in-coverage UE, and the ID information is greater than the predetermined value based on the second D2D UE being the out-of-coverage UE.

7. The second D2D UE of claim 5, wherein transmit power of the PSBCH and transmit power of the secondary D2D SS have different values.

8. The second D2D UE of claim 5,
wherein the transient period is a channel estimation period for the PSBCH.

* * * * *